United States Patent Office 2,897,199
Patented July 28, 1959

2,897,199
4,9α-DIHALO-11-OXYGENATED DERIVATIVES OF PROGESTERONE

Howard J. Ringold and Enrique Batres, Mexico City, Mexico, assignors to Syntex S.A., Mexico City, Mexico, a corporation of Mexico No Drawing. Application September 10, 1958
Serial No. 760,088

Claims priority, application Mexico September 11, 1957

17 Claims. (Cl. 260—239.55)

The present invention relates to novel cyclopentanophenanthrene compounds.

More particularly the present invention relates to 4,9α-dihalo-11-keto or hydroxy derivatives of progesterone. The novel compounds of the present invention just described are progestational hormones. In addition they exhibit a strong anti-leukemic effect, i.e. causing lysis of leukemic cells in vitro. Further since they may be conventional means be provided with a 21-hydroxy group and a 17α-hydroxy group they are valuable intermediates for the production of the corresponding 4,9α-dihalo derivatives of cortisone and hydrocortisone which are valuable anti-inflammatory drugs.

In accordance with the present invention the aforementioned novel compounds were prepared from 11α-hydroxy progesterone by forming therefrom 4β,5β-oxido-pregnan-11α-ol-3,20-dione, opening the epoxide with a hydrogen halide to form the corresponding 4-halo-11α-hydroxy-progesterone and thereafter introducing the 9α-halo group by the same type of reaction disclosed by Fried and Sabo J.A.C.S. 79, 1130 (1957).

The novel compounds of the present invention are illustrated by the following formula:

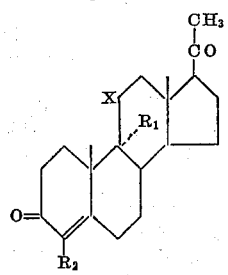

In the above formula X represents=O or

$R_1$ represents fluoro, bromo or chloro, and $R_2$ represents chloro or bromo.

The novel compounds above set forth are prepared by a process illustrated by the following equation.

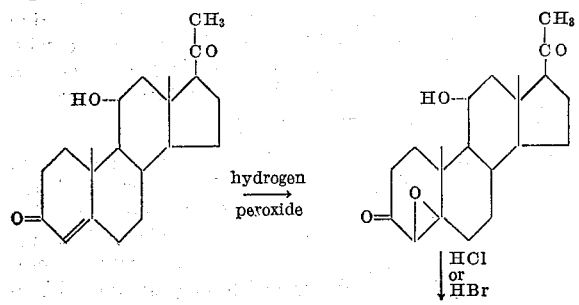

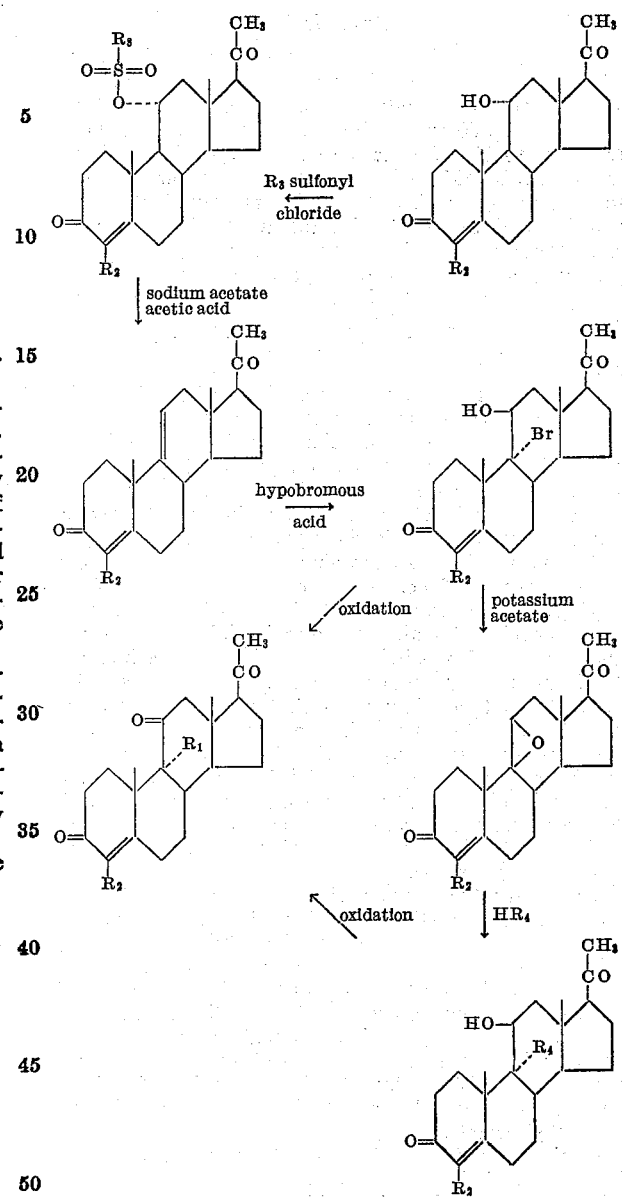

In the above equation $R_1$ and $R_2$ represent the same groups as heretofore. $R_3$ represents lower alkyl or aryl, $R_4$ represents chlorine or fluorine.

In practicing the process above outlined 11α-hydroxy progesterone is reacted with hydrogen peroxide in alkaline medium to prepare 4β,5β-oxido-pregnan-11α-ol-3,20-dione, reaction of this last compound with hydrochloric acid or hydrobromic acid gave the 4-chloro-11α-hydroxy-progesterone or the 4-bromo-11α-hydroxy-progesterone respectively. These compounds upon reaction with a lower alkyl or aryl sulfonyl chloride gave the respective alkyl sulfonic or aryl sulfonic ester which was treated with sodium acetate in acetic acid solution to give the respective 4-halo-Δ$^{4,9(11)}$-pregnadien-3,20-dione compound. By addition of hypobromous acid there was then produced the respective 4-halo (chloro or bromo)-9α-bromo-11β-hydroxy-progesterone. These compounds upon refluxing with potassium acetate gave the respective 9β,11β- oxido derivatives which when opened with hydrochloric or hydrofluoric acid gave the 4,9α-dihalo-11β-hydroxyprogesterones indicated in the equation. Conventional oxidation then gave the corresponding 11-keto derivatives.

The following specific examples serve to illustrate but are not intended to limit the present invention.

*Example I*

10 g. of 11α-hydroxyprogesterone dissolved in 300 cc. of methanol was treated with 20 cc. of 10% aqueous sodium hydroxide solution, cooled to 0° C. and treated dropwise with 60 cc. of 35% hydrogen peroxide previously cooled to 0° C., while the temperature of the mixture was kept below 5° C. The mixture was allowed to react for 4 hours at 0° C. and then it was poured into water and ice and extracted with methylene dichloride; the extract was washed with water to neutral, dried and completely evaporated, thus leaving a crystalline mass which was chromatographed with 300 g. of alkaline alumina; elution with benzene-ether afforded 4β,5β-oxido-pregnan-11α-ol-3,20-dione which was recrystallized from methanol.

8 g. of the above epoxide was dissolved in 120 cc. of acetone and treated at room temperature with 8 cc. of concentrated hydrochloric acid; after 45 minutes it was poured into water, cooled and the precipitate was filtered and dried on the steam bath. There was thus obtained 4-chloro-11α-hydroxyprogesterone which upon crystallization from acetone yielded the pure substance.

A solution of 5 g. of the above 4-chloro-11α-hydroxyprogesterone in 20 cc. of chloroform and 25 cc. of anhydrous pyridine was cooled to 0° C. and mixed 7 g. of tosyl chloride, with stirring and maintaining the temperature at 0° C. The stirring was continued for 4 hours at 0° C. and then at room temperature for 15 hours. Ice was added and the mixture was diluted with water and extracted with chloroform. The extract was washed with water, dilute hydrochloric acid, 5% sodium carbonate solution and finally with water, dried over anhydrous sodium sulfate, filtered and evaporated to dryness. The residue was dissolved in absolute ethanol and upon concentration and cooling there was obtained the 11α-tosylate of 4-chloro-progesterone.

6 g. of the 11α-tosylate of 4-chloro progesterone was slowly added to a stirred solution of 8 g. of anhydrous sodium acetate in 70 cc. of glacial acetic acid and the mixture was heated to a temperature around 110° C.

After refluxing for half an hour the mixture was cooled in an ice bath and slowly diluted, with stirring, with 100 cc. of water. The precipitate formed was collected and washed with dilute hydrochloric acid and water. There was thus obtained 4-chloro-$\Delta^{4,9(11)}$-pregnadien-3,20-dione. The analytical sample was obtained by recrystallization from ethyl acetate.

A mixture of 5 g. of 4-chloro-$\Delta^{4,9(11)}$-pregnadien-3,20-dione, 5 cc. of dioxane and 7 cc. of 0.5 normal perchloric acid was treated with 2.3 g. of N-bromoacetamide in the course of 1 hour, while the mixture was stirred in the dark. The stirring was continued for one hour further and then 10% aqueous sodium sulfite solution was added until the reaction with potassium iodide-starch paper no longer gave a blue color. Ice was added followed by 50 cc. of chloroform and the organic layer was separated and washed with water, taking care that the temperature of the solution did not rise over 15° C. by the addition of pieces of ice. The extract was evaporated under reduced pressure in a bath kept below 25° C. The remaining syrupy residue was triturated with 20 cc. of acetone and cooled in the refrigerator for several hours. The precipitate was filtered and the filtrate was concentrated to give a second crop upon cooling. There was thus obtained 4-chloro-9α-bromo-11β-hydroxyprogesterone.

A solution of 4 g. of anhydrous potassium acetate in 40 cc. of absolute ethanol was heated nearly to boiling and then there was added a solution of 5 g. of 4-chloro-9α-bromo-11β-hydroxyprogesterone, obtained as described above, in 20 cc. of dioxane. The mixture was refluxed for 40 minutes, cooled in an ice bath, treated with 90 cc. of ice water and vigorously stirred, thus giving 4-chloro-9β,11β-oxido-$\Delta^4$-pregnen-3,20-dione. Concentration of the mother liquors afforded an additional amount of the same compound. The analytical sample was obtained by recrystallization from acetone.

A solution of 4 g. of 4-chloro-9β,11β-oxido-$\Delta^4$-pregnen-3,20-dione in 40 cc. of redistilled chloroform was treated with 30 cc. of a 0.45 normal cold chloroform solution of dry hydrogen chloride, which was added in the course of 35 minutes while the mixture was kept around 0° C. It was kept at 0° C. for one hour, water was added, the chloroform layer was separated, washed with water, dried over anhydrous sodium sulfate, filtered and evaporated to dryness under reduced pressure. The crystalline residue was purified by recrystallization from acetone, thus producing 4,9α-dichloro-11β-hydroxyprogesterone.

*Example II*

A solution of 5 g. of 4-chloro-9β,11β-oxido-$\Delta^4$-pregnen-3,20-dione, prepared in accordance with the method of the previous example, in 110 cc. of redistilled chloroform was placed in a polyethylene bottle fitted with a mechanical stirrer and cooled to 0° C. There was then introduced a stream of dry hydrogen fluoride gas while the temperature was maintained below 0° C., with stirring. The stream of gas was passed until the mixture increases its weight by 0.6 g., which took approximately 20 minutes. The mixture was kept for 2 hours more at 0° C. and then there was cautiously added a suspension of sodium bicarbonate in water, with stirring, until the mixture showed a weakly alkaline reaction. The mixture was transferred to a separatory funnel and the chloroform layer was separated, washed with water, 5% sodium carbonate solution and water, dried over anhydrous sodium sulfate, filtered and evaporated to dryness under reduced pressure. The residue crystallized from ethyl acetate, thus yielding 4-chloro-9α-fluoro-11β-hydroxyprogesterone.

*Example III*

In the method of Example I in the step of the opening of the epoxide of 4β,5β-oxido-pregnan-11α-ol-3,20-dione, the hydrochloric acid was substituted by constant boiling hydrobromic acid solution; there were thus obtained 4-bromo-11α-hydroxyprogesterone, its 11-tosylate, 4-bromo-$\Delta^{4,9(11)}$-pregnadien-3,20-dione, 4,9α-dibromo-11β-hydroxyprogesterone and 4-bromo-9β,11β-oxido-$\Delta^4$-pregnen-3,20-dione; the final product was 4-bromo-9α-chloro-11β-hydroxyprogesterone.

*Example IV*

When in the method of Example I 4-chloro-9β,11β-oxido-$\Delta^4$-pregnen-3,20-dione was substituted by 4-bromo-9β,11β-oxido-$\Delta^4$-pregnen-3,20-dione, there was obtained 4-bromo-9α-fluoro-11β-hydroxyprogesterone.

*Example V*

A solution of 1 g. of 4-chloro-9α-fluoro-11β-hydroxyprogesterone, described in Example II, in 30 cc. of acetic acid was treated with a solution of 400 mg. of chromium trioxide in 6 cc. of 80% acetic acid and the mixture was stirred at room temperature for 2 hours. After pouring into ice water the precipitate was filtered, washed with water, dried under vacuum and recrystallized from acetone, thus yielding 4-chloro-9α-fluoro-11-keto-progesterone.

*Example VI*

By the method of the previous example, there were oxidized the other 4,9α-dihalo-11-hydroxy compounds described in Examples I to IV, to form the corresponding 11-keto compounds. There were thus obtained: 4-chloro-9α-bromo-11-ketoprogesterone, 4,9α-dibromo-11-ketoprogesterone, 4,9α-dichloro-11-ketoprogesterone, 4-bromo-9α-chloro-11-ketoprogesterone and 4-bromo-9α-fluoro-11-ketoprogesterone.

*Example VII*

In the preparation of 4-chloro-Δ$^{4,9(11)}$-pregnadien-3,20-dione described in Example I, there was substituted the tosyl chloride by mesyl chloride, thus producing as an intermediate the 11α-mesylate of 4-chloro-11α-hydroxyprogesterone.

We claim:
1. A compound of the following formula:

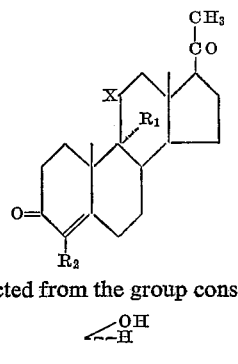

wherein X is selected from the group consisting of =O and ‹OH / ‹H, R$_1$ is selected from the group consisting of fluoro, bromo and chloro and R$_2$ is selected from the group consisting of chloro and bromo.
2. 4-chloro-9α-bromo-Δ$^4$-pregnen-11β-ol-3,20-dione.
3. 4,9α-dichloro-Δ$^4$-pregnen-11β-ol-3,20-dione.
4. 4-chloro-9α-fluoro-Δ$^4$-pregnen-11β-ol-3,20-dione.
5. 4,9α-dibromo-Δ$^4$-pregnen-11β-ol-3,20-dione.
6. 4-bromo-9α-chloro-Δ$^4$-pregnen-11β-ol-3,20-dione.
7. 4-bromo-9α-fluoro-Δ$^4$-pregnen-11β-ol-3,20-dione.
8. 4-chloro-9α-bromo-Δ$^4$-pregnen-3,11,20-trione.
9. 4,9α-dichloro-Δ$^4$-pregnen-3,11,20-trione.
10. 4-chloro-9α-fluoro-Δ$^4$-pregnen-3,11,20-trione.
11. 4,9α-dibromo-Δ$^4$-pregnen-3,11,20-trione.
12. 4-bromo-9α-chloro-Δ$^4$-pregnen-3,11,20-trione.
13. 4-bromo-9α-fluoro-Δ$^4$-pregnen-3,11,20-trione.
14. 4-chloro-Δ$^{4,9(11)}$-pregnadien-3,20-dione.
15. 4-bromo-Δ$^{4,9(11)}$-pregnadien-3,20-dione.
16. 4-chloro-9β,11β-oxido-Δ$^4$-pregnen-3,20-dione.
17. 4-bromo-9β,11β-oxido-Δ$^4$-pregnen-3,20-dione.

References Cited in the file of this patent

UNITED STATES PATENTS

| | | |
|---|---|---|
| 2,732,385 | Krsek | Jan. 24, 1956 |
| 2,816,120 | Fried | Dec. 10, 1957 |